US008634271B2

(12) United States Patent
Sablon

(10) Patent No.: US 8,634,271 B2
(45) Date of Patent: Jan. 21, 2014

(54) VARIABLE DEPTH STREAMER SRME

(75) Inventor: Ronan Sablon, Massy Cedex (FR)

(73) Assignee: CGGveritas Services SA, Massy Cedex (FR)

( * ) Notice: Subject to any disclaimer, the term of this patent is extended or adjusted under 35 U.S.C. 154(b) by 0 days.

(21) Appl. No.: 13/600,270

(22) Filed: Aug. 31, 2012

(65) Prior Publication Data

US 2013/0176818 A1 Jul. 11, 2013

Related U.S. Application Data

(60) Provisional application No. 61/585,431, filed on Jan. 11, 2012.

(51) Int. Cl.
*G01V 1/38* (2006.01)
(52) U.S. Cl.
CPC .............. *G01V 1/38* (2013.01); *G01V 2210/56* (2013.01)
USPC .......................................................... 367/24
(58) Field of Classification Search
USPC ..................................... 367/21, 24
See application file for complete search history.

(56) References Cited

U.S. PATENT DOCUMENTS

| | | | | |
|---|---|---|---|---|
| 4,875,166 | A * | 10/1989 | Carroll et al. | 702/17 |
| 4,992,992 | A * | 2/1991 | Dragoset, Jr. | 367/21 |
| 7,373,252 | B2 * | 5/2008 | Sherrill et al. | 702/17 |
| 8,339,896 | B2 * | 12/2012 | van Borselen et al. | 367/24 |
| 2009/0296502 | A1 * | 12/2009 | Richards | 365/193 |
| 2011/0305109 | A1 * | 12/2011 | Soubaras | 367/24 |

OTHER PUBLICATIONS

Sablon et al, "Multiple attenuation for variable-depth streamer data: from deep to shallow water", SEG San Antonio 2011 Annual Meeting, 2011.*
Berkhout, A. J., and Verschuur, D. J., "Estimation of multiple scattering by iterative inversion, Part I: Theoretical considerations" Geophysics, vol. 62, No. 5 Sep.-Oct. 1997, pp. 1586-1595.
Robert Soubaras, "Deghosting by joint deconvolution of a migration and a mirror migration" SEG Denver 2010 Annual Meeting, Oct. 15-17, 2010, pp. 3406-3410.
Ronan Sablon et al., "Multiple for Variable-depth stremer data from deep water to shallow water" SEG San Antonio Annual Meeting Sep. 18-23, 2011, pp. 3505-3509.
R. Brooymans, et al. "A Review of Current Marine Demultiple Techniques with Examples from the East Coast of Canada", 2003, p. 4.
R. E. Sheriff, et al. "Exploration Seismology", Cambridge University Press, 1995, pp. 161-169, New York, U.S.A.
R. E. Sheriff, et al. "Exploration Seismology", Cambridge University Press, 1995, pp. 326-327, New York, U.S.A.
B. Ver West, "Suppressing Peg-leg Multiples with Parabolic Radon Demultiple", EAGE 64th Conference & Exhibition—Florence, Italy, May 27-30, 2002.
GB Search Report mailed May 9, 2013 in related Application No. GB1300124.3.

* cited by examiner

*Primary Examiner* — Isam Alsomiri
*Assistant Examiner* — Krystine Breier
(74) *Attorney, Agent, or Firm* — Patent Portfolio Builders PLLC

(57) ABSTRACT

Methods and systems for variable wavelet correction are described. A variable depth dataset is deghosted before presentation to a multiples prediction step of multiples elimination model. In another aspect, the multiples prediction is reghosted before presentation to an adaptive subtraction step of the multiples elimination model. A source-side zero-phasing signature can be applied before deghosting and a predefined gain can be applied in the low and high frequency sides as part of deghosting and reghosting to compensate for the squaring effect produced by convolving wavelets.

20 Claims, 8 Drawing Sheets

VARIABLE DEPTH STREAMER SRME

RELATED APPLICATION

The present application is related to, and claims priority from U.S. Provisional Patent Application No. 61/585,431, filed Jan. 11, 2012, entitled "BroadSeis SRME," to Ronan Sablon, the disclosure of which is incorporated herein by reference.

TECHNICAL FIELD

Embodiments of the subject matter disclosed herein generally relate to methods and systems for seismic data processing and, more particularly, to mechanisms and techniques for eliminating 2D/3D surface related multiples associated with variable-depth streamer data processing.

BACKGROUND

Marine-based seismic data acquisition and processing techniques are used to generate a profile (image) of a geophysical structure (subsurface) of the strata underlying the seafloor. This profile does not necessarily provide an accurate location for oil and gas reservoirs, but it may suggest, to those trained in the field, the presence or absence of oil and/or gas reservoirs. Thus, providing an improved image of the subsurface in a shorter period of time is an ongoing process.

The acquisition of data in marine-based seismic methods usually produces different results in source strength and signature based on differences in near-surface conditions. Further data processing and interpretation of seismic data requires correction of these differences in the early stages of processing. Surface-Related Multiples Elimination (SRME) is a technique commonly used to predict a multiples model from conventional flat streamer data. Attenuating the surface-related multiples is based on predicting a multiples model, adapting the multiples model and subtracting the adapted multiples model from the input streamer data.

Obtaining accuracy with the conventional method requires a general two-step, pre-conditioning process. First, the input data is adjusted to a sea-level datum and second, a designature is applied to the input data such that the input traces are zero-phase. One of the key challenges of the conventional method is adjusting the standard SRME technique for use with variable depth streamer data, i.e., seismic data from streamers that are at a greater depth as you move from a near offset to a greater offset.

Compared to conventional same depth streamer data, processing variable depth streamer data requires a significant processing change with respect to receiver ghosts. In conventional same depth streamer data processing, both source and receiver ghosts are included in a wavelet and are assumed to be consistent from streamer offset to streamer offset. On the contrary, in a variable depth streamer dataset, the receiver ghosts change from near streamer offsets to far streamer offsets, breaking an implicit assumption of constant depth streamers associated with many processing steps including SRME and therefore cannot be included in the wavelets.

Attempts to correct the conventional method for variable depth streamers have been made based on a pre-stack or post-stack joint deconvolution for removing the receiver ghosts from the final image. A zero-phasing designature is applied for the source side only, which means the input wavelet for the SRME processing retains the zero-phased receiver ghosts. The conventional SRME technique was not defined to handle these types of wavelet variations, i.e., by convolving traces with different receiver ghosts, and therefore the conventional SRME produces a multiples model with mismatched wavelets.

The mismatched wavelet problem can be partially solved in the adaptive subtraction part of the process, through wavelet adjustment in the common channel domain, but the effectiveness of this approach does not meet the quality of a similar analysis with constant depth streamer data. Further, this attempt leaves many high-frequencies residual multiples and the low-frequencies multiples cannot be properly addressed.

Accordingly, it would be desirable to provide systems and methods that avoid the afore-described problems and drawbacks, and improve the multiples model prediction for variable-depth streamer data and the accuracy of the final image.

SUMMARY

According to an exemplary embodiment, a method, stored in a memory and executing on a processor, for correcting wavelet variations associated with a variable depth streamer configuration for seismic data collection, the method comprises processing a recorded variable-depth datum pre-stack dataset, in a shot gather domain, by deghosting the pre-stack dataset wherein all multiples orders are processed; and outputting a deghosted pre-stack dataset wherein the deghosted pre-stack dataset is normalized to a sea-surface datum and provided to a multiples elimination technique.

According to another exemplary embodiment, a system for correcting wavelet variations associated with a variable-depth streamer configuration, the system comprises a dataset containing a plurality of streamer variable-depth input trace data; one or more processors configured to execute computer instructions and a memory configured to store said computer instructions wherein said computer instructions further comprises a deghosting component for processing a recorded variable-depth datum pre-stack dataset, in a shot gather domain, wherein all multiples orders are processed; and an output component for outputting a deghosted pre-stack dataset wherein said deghosted pre-stack dataset is normalized to a sea-surface datum and provided to a multiples elimination technique.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology and structure of estimating more reliable surface-consistent attributes using a common inversion scheme. However, the embodiments to be discussed next are not limited to these configurations, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

In order to provide a context for the subsequent exemplary embodiments, a description of aspects and terminology is hereby included. The methods and systems described herein generate and receive P-waves. A P-wave is the wave studied in conventional seismic data and is an elastic body wave or sound wave in which particles oscillate in the direction the wave propagates. A streamer is a line towed by a streamer vessel and containing a plurality of receivers for collecting seismic data from the reflected wave. A variable-depth streamer indicates that the depth of the receivers from the surface of the sea varies as you travel along the length of the streamer.

In a further description of terminology, a shotpoint is one of a number of locations or stations at a surface datum at which a seismic source is activated. A seismic trace is the seismic data recorded, by one channel, after the seismic source has been fired. The seismic trace represents the response of the elastic wave field to velocity and density contrasts across interfaces of layers of rock or sediments in the seabed as energy travels from the seismic source through the subsurface to a receiver or receiver array. Further, a seismic inversion is a process of transforming seismic reflection data into a quantitative property description of a strata description of an underground location and possibly a reservoir containing natural resources such as oil or gas.

Figure 1:
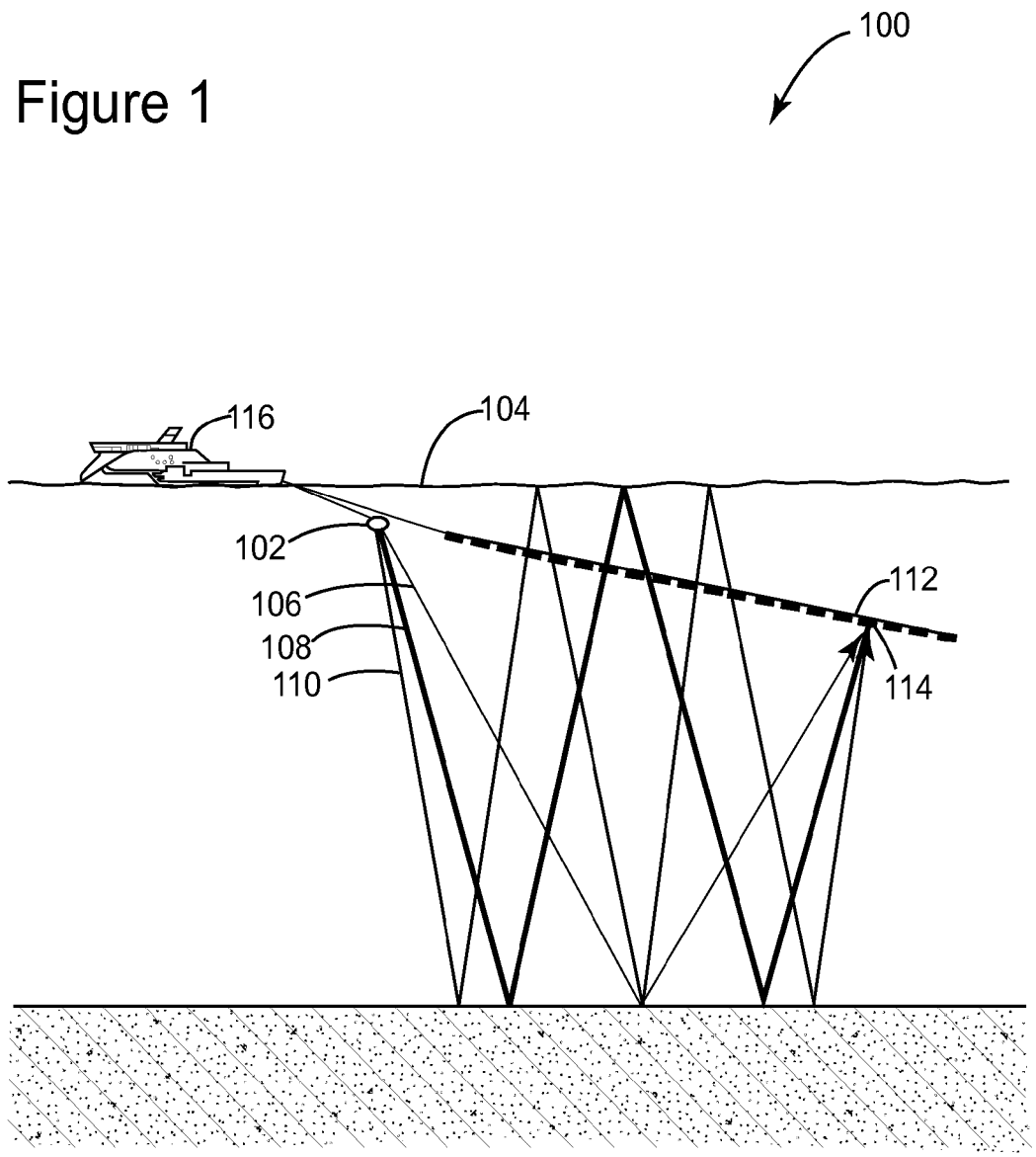
FIG. 1 is a schematic diagram illustrating a marine-based seismic data acquisition system with a variable depth streamer and up-going rays.
Figure 2:
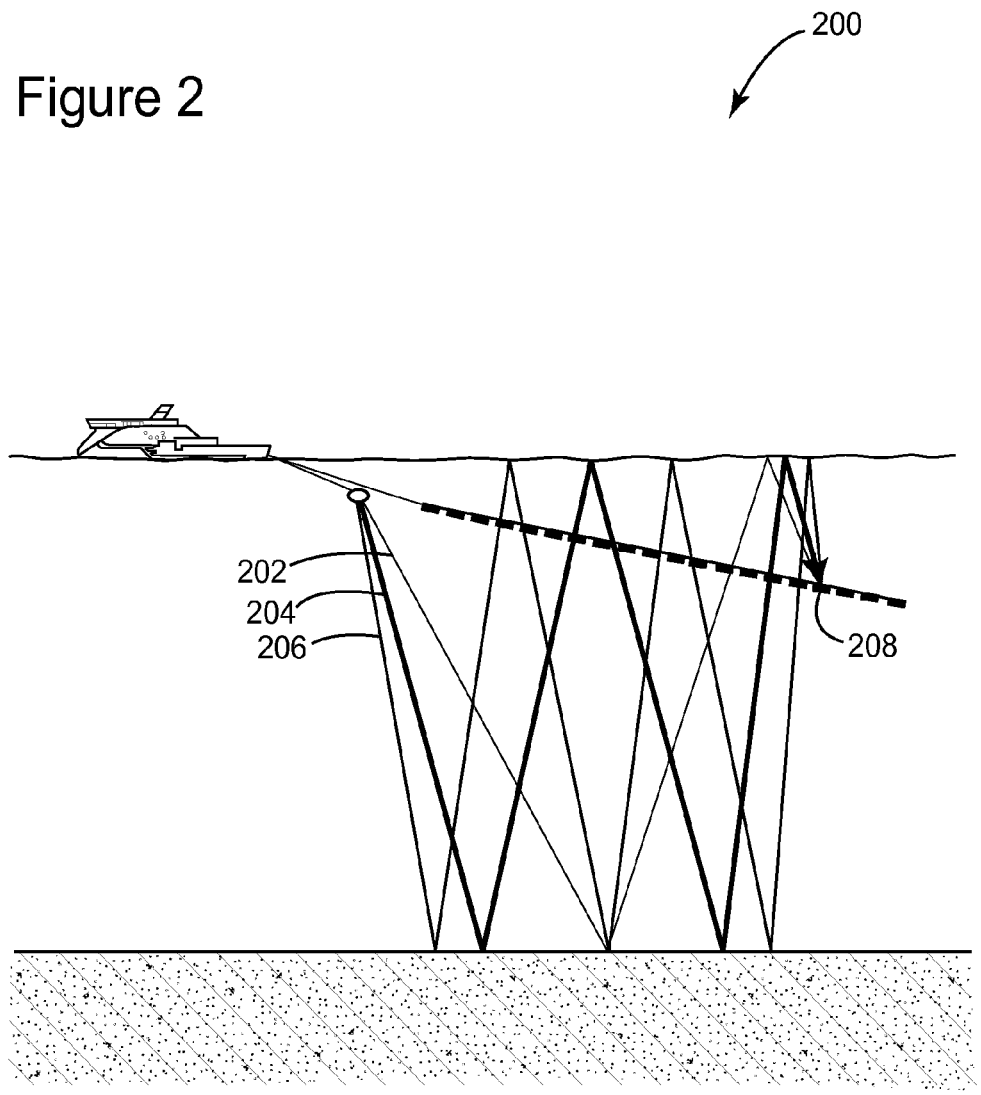
FIG. 2 is a schematic diagram illustrating a marine-based seismic data acquisition system with a variable depth streamer and down-going rays.

Looking now to FIG. 1, a context diagram illustrates the previously described aspects for an up-going ray path 100. A shot is fired at a shotpoint 102 near the sea surface 104 to propagate a series of waves 106, 108, 110 reflected off the sea floor and collected by the receivers 114 attached to the streamer 112. The waves are reflected by the sea surface 104 at different times after the shot is fired and at different angles. The reflected waves are detected by receivers 114 attached to the streamers 112 wherein a direct wave 106 can be recorded in conjunction with reflected waves 108, 110. A recording device, aboard the tow vessel 116, collects the seismic data from the receivers and records the data for future analysis. It should be noted in the exemplary embodiment that computations on the recorded data can occur in the recording device or can occur in another location after the seismic data has been transferred. Looking to FIG. 2, a similar diagram illustrates the fact that waves 202, 204, 206 can also be recorded in a down-going ray path 200 and the same receiver 208 can receive waves 202, 204, 206 that have been reflected a variable and different number of times before reaching a receiver 208.

Figure 3:
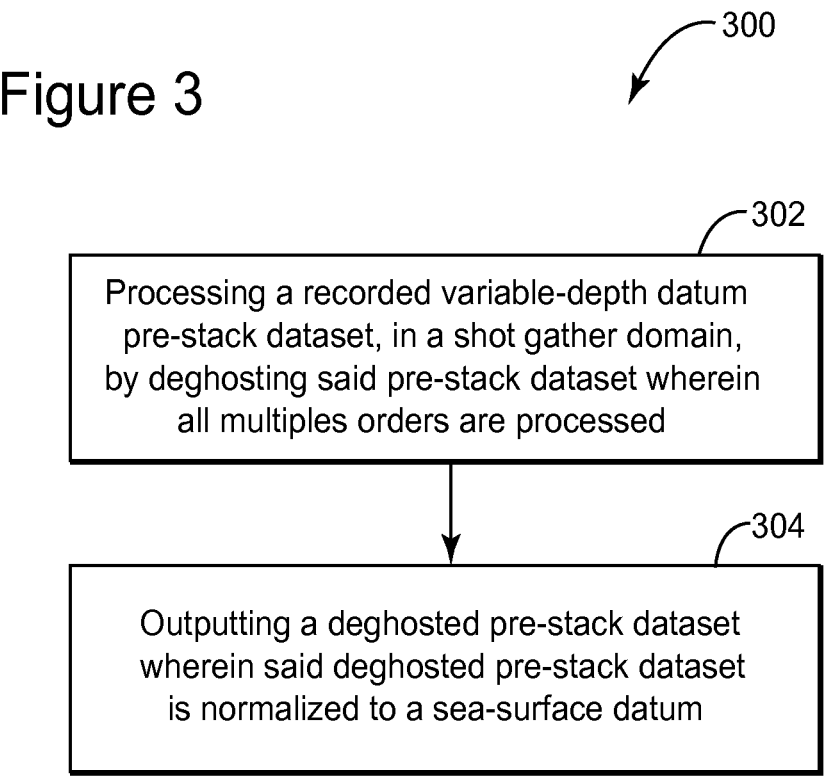
FIG. 3 is a flowchart illustrating a method for variable wavelet correction.

Looking now to FIG. 3, an exemplary method embodiment of a variable wavelet correction 300 is depicted. Starting at step 302 of the exemplary method embodiment, the variable wavelet correction 300 method processes a recorded pre-stack dataset. In another aspect of the exemplary method embodiment step 302, the recorded pre-stack dataset is comprises a variable depth datum based on the characteristics of the variable depth streamer and the corresponding variable depths of the receivers attached to the streamer. Further, in step 302 of the exemplary method embodiment, the processing occurs in a shot gather domain and all multiples orders are processed.

Next, at step 304 of the exemplary method embodiment, the variable wavelet correction 300 outputs a deghosted pre-stack dataset for further processing. Further, in step 304 of the exemplary method embodiment, the deghosted pre-stack dataset is normalized to a sea-level datum. It should be noted in the exemplary method embodiment that the normalized pre-stack dataset is now suitable for processing by multiple elimination techniques unaware of a variable depth datum. It should be noted in the exemplary embodiment that the deghosting and reghosting of the described exemplary embodiments can be accomplished by a method such as that described in U.S. patent application Ser. No. 13/334,776 entitled "Device and Method for Deghosting Variable Depth Streamer Data" by Gordon Poole, the disclosure of which is incorporated herein by reference.

Figure 4:
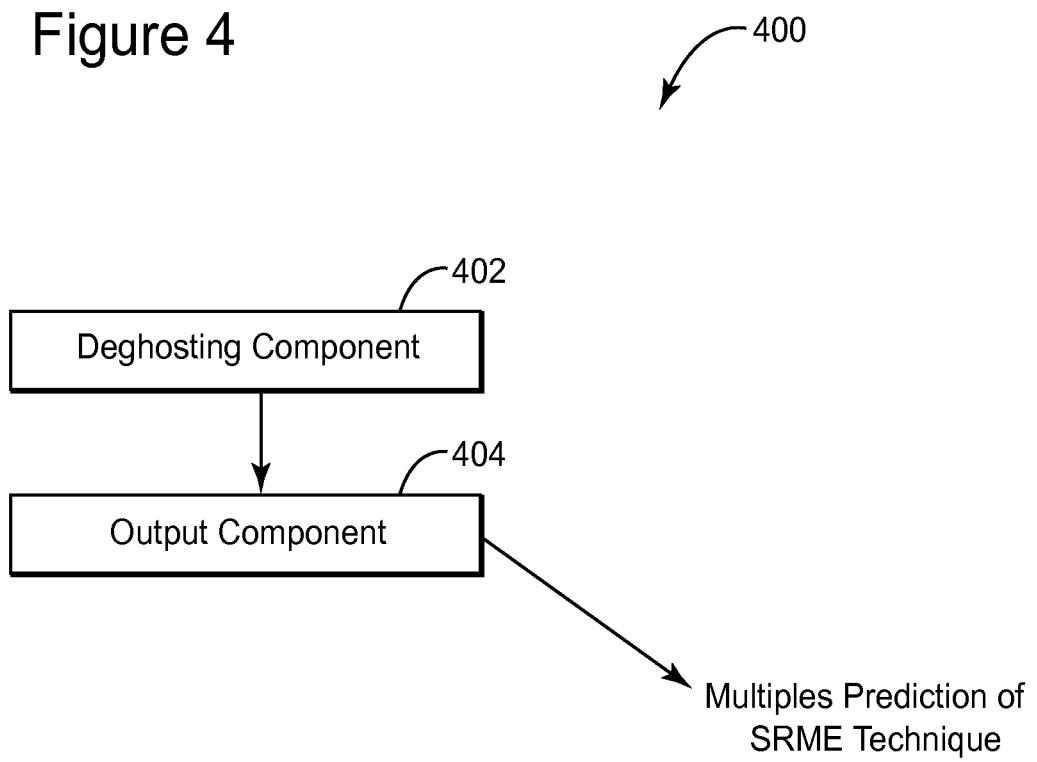
FIG. 4 is a schematic diagram illustrating a system for variable wavelet correction comprising a deghosting component and an output component.

Looking now to FIG. 4, an exemplary embodiment of a system for variable wavelet correction 400 is depicted. The variable wavelet correction system 400 comprises a deghosting component 402 and an output component 404. It should be noted in the exemplary embodiment that the output component provides a deghosted pre-stack dataset to a multiples prediction component of a multiples elimination technique.

Continuing with the exemplary embodiment, the deghosting component 402 performs a two-dimensional pre-stack deghosting in the shot gather domain. It should be noted in the exemplary embodiment that the deghosting component 402 can also operate on three-dimensional pre-stack datasets. In another aspect of the exemplary embodiment, the deghosting component 402 applies a source-side zero-phasing designature before the deghosting of the pre-stack dataset. It should be noted in the exemplary embodiment that a result of the deghosting by the deghosting component 402 is that the pre-stack data has been shifted form the recorded variable depth datum to a sea surface datum. In another aspect of the exemplary embodiment, the deghosting component 402 applies a pre-defined gain in the low and high frequency sides of the deghosting for compensating for the squaring effect associated with convolving two wavelets.

Next in the exemplary embodiment, the output component 404 formats the deghosted pre-stack dataset to a format acceptable for the multiples prediction component of the selected multiples elimination technique. In another aspect of the exemplary embodiment the output component delivers the ghost free formatted pre-stack dataset to the model prediction component of the selected multiples elimination technique and the model prediction component generates a ghost free multiples model based on the ghost free data.

Figure 5:
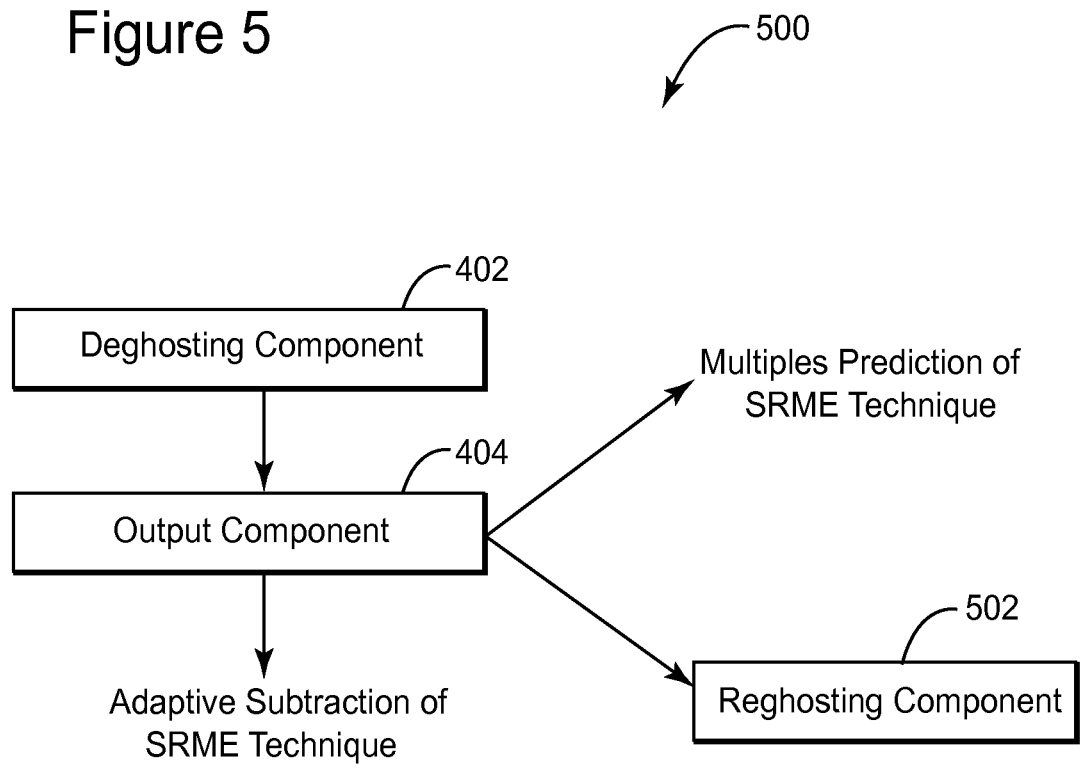
FIG. 5 is a schematic diagram illustrating a system for variable wavelet correction comprising a deghosting component, an output component and a reghosting component.

Looking now to FIG. 5, another exemplary embodiment of a system for variable wavelet correction 500 is depicted. The variable wavelet correction 500 system comprises a deghosting component 402 and an output component 404 as described previously, and a reghosting component 502. Continuing with the exemplary embodiment, the reghosting component 502 processes the multiples model produced by the multiples prediction component of the selected multiples elimination technique and reghosts the predicted multiples model in the shot-gather domain. In another aspect of the exemplary embodiment, the pre-stack reghosting inserts the multiples model from the sea-surface datum pre-stack dataset in the recorded datum pre-stack dataset. In another aspect of the exemplary embodiment, the deghosting component 402 applies a pre-defined gain in the low and high frequency sides of the deghosting for compensating for the squaring effect associated with convolving two wavelets. Further in the exemplary embodiment, the deghosting component delivers the reghosted pre-stack dataset to the output component 404.

Continuing with the exemplary embodiment, it should be noted that the output component 404 further comprises the capability to format the reghosted pre-stack dataset to a format acceptable to the adaptive subtraction component of the selected multiples elimination technique. It should be noted in the exemplary embodiment that the reghosted pre-stack dataset allows the adaptive subtraction component of the selected multiples elimination technique to efficiently address the entire frequency range of the pre-stack dataset. It should be noted in the exemplary embodiment that the selected multiples elimination technique includes but is not limited to Surface Related Multiples Elimination (SRME) technique, Shallow Water Demultiple technique, Convolution Inter-bed Multiples technique, Radon Demultiple technique and Tau-P Deconvolution technique or any demultiple technique which creates a multiples model for subtraction from the input data.

Figure 6:
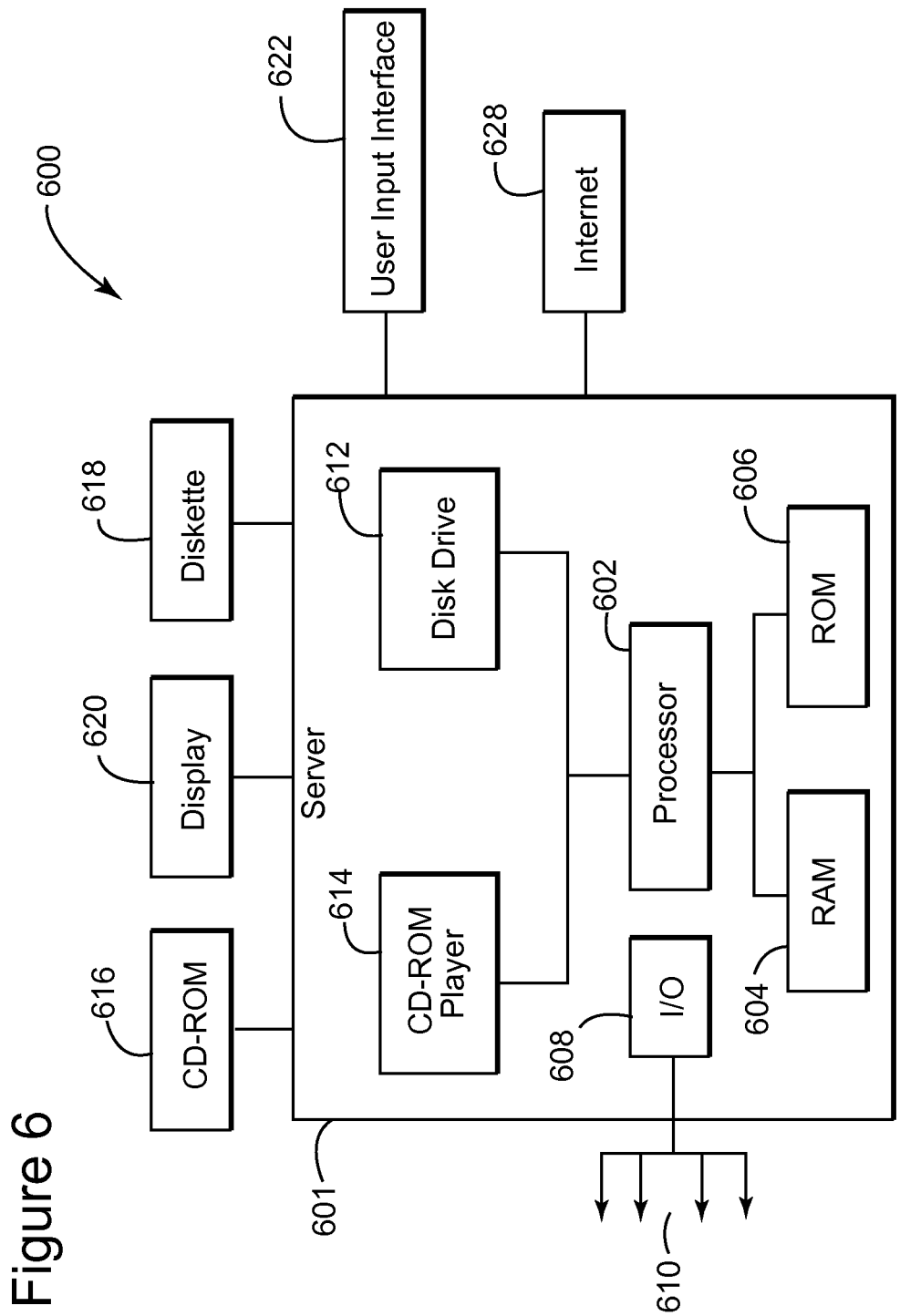
FIG. 6 is a schematic diagram of a computerized system that implements various methods according to an exemplary embodiment.

The computing device or other network nodes involved in the variable wavelet correction in connection with the above described embodiments may be any type of computing device capable of processing and communicating pre-stack datasets. An example of a representative computing system capable of carrying out operations in accordance with the servers of the exemplary embodiments is illustrated in FIG. 6. Hardware, firmware, software or a combination thereof may be used to perform the various steps and operations described herein. The computing structure 600 of FIG. 6 is an exemplary computing structure that may be used in connection with such a system.

The exemplary computing arrangement 600 suitable for performing the activities described in the exemplary embodiments may include a pre-stack dataset processing server. Such a server 601 may include a central processor (CPU) 602 coupled to a random access memory (RAM) 604 and to a read-only memory (ROM) 606. The ROM 606 may also be other types of storage media to store programs, such as programmable ROM (PROM), erasable PROM (EPROM), etc. The processor 602 may communicate with other internal and external components through input/output (I/O) circuitry 608 and bussing 610, to provide control signals and the like. The processor 602 carries out a variety of functions as is known in the art, as dictated by software and/or firmware instructions.

The server 601 may also include one or more data storage devices, including hard and floppy disk drives 612, CD-ROM drives 614, and other hardware capable of reading and/or storing information such as DVD, etc. In one embodiment, software for carrying out the above discussed steps may be stored and distributed on a CD-ROM 616, diskette 618 or other form of media capable of portably storing information. These storage media may be inserted into, and read by, devices such as the CD-ROM drive 614, the disk drive 612, etc. The server 601 may be coupled to a display 620, which may be any type of known display or presentation screen, such as LCD displays, plasma display, cathode ray tubes (CRT), etc. A user input interface 622 is provided, including one or more user interface mechanisms such as a mouse, keyboard, microphone, touch pad, touch screen, voice-recognition system, etc.

The server 601 may be coupled to other computing devices, such as the landline and/or wireless terminals and associated watcher applications, via a network. The server may be part of a larger network configuration as in a global area network (GAN) such as the Internet 628, which allows ultimate connection to the various landline and/or mobile client/watcher devices.

The disclosed exemplary embodiments provide a user terminal, a system, a method and a computer program product for variable wavelet correction associated with seismic data. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

Figure 7C:
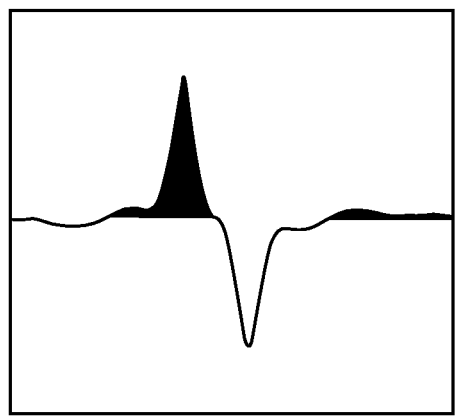
FIG. 7 is a composite schematic diagram of an input wavelet based on a variable depth streamer in 7a, a standard SRME wavelet prediction in 7b and an exemplary embodiment with a variable wavelet correction applied to the input data as part of a standard SRME wavelet prediction in 7c.
Figure 7B:
Figure 7A:
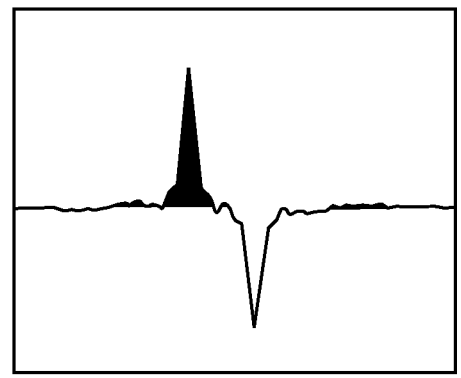

The results of an exemplary embodiment of the aforementioned variable wavelet correction are illustrated in a comparison between FIGS. 7a, 7b and 7c and FIGS. 8a and 8b. In the example depicted in FIG. 7, FIG. 7a depicts an input wavelet with a variable-depth streamer, FIG. 7b depicts the input wavelet after a standard SRME technique is applied and FIG. 7c depicts the input wavelet after an exemplary embodiment variable wavelet correction is applied in conjunction with a standard SRME technique. It is clear that when the standard SRME technique is applied to a variable-depth datum as shown in FIG. 7b, incorrect wavelets are predicted leading to unacceptable errors in the technique. In comparison, FIG. 7c shows an exemplary embodiment variable wavelet correction of the variable-depth streamer data leading to a prediction matching the input wavelet data of FIG. 7a.

Figure 8A:
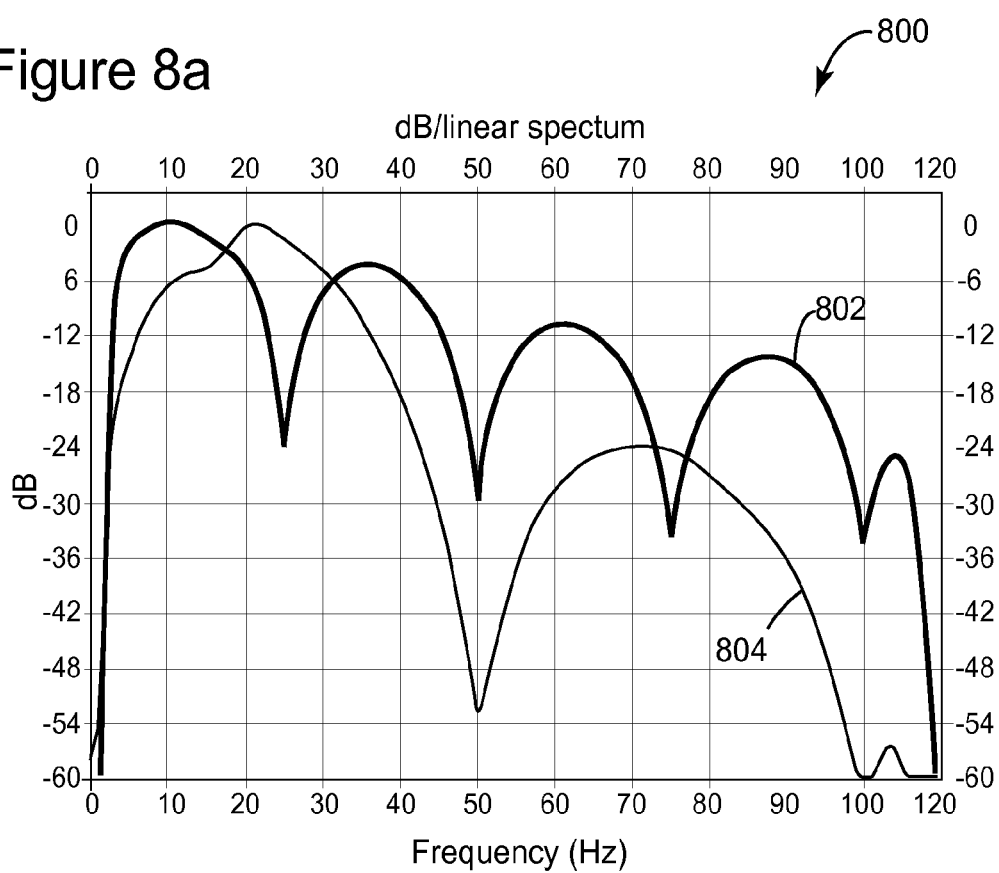
FIG. 8 is a composite schematic diagram with 8a depicting an input spectrum from a variable depth streamer versus a spectrum predicted by a standard SRME technique based on variable depth streamer data and 8b depicting an input spectrum from a variable depth streamer versus a spectrum predicted by an exemplary embodiment variable wavelet correction applied to the variable depth streamer data before a standard SRME technique prediction.
Figure 8B:
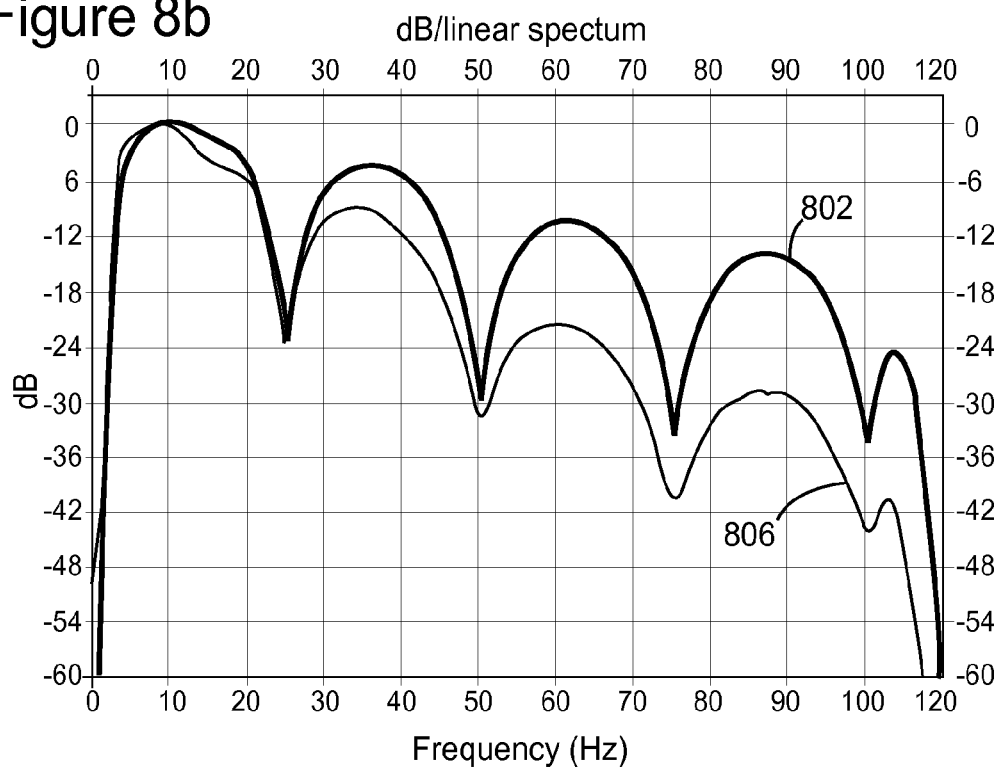

In another example of the results of an exemplary embodiment, depicted in FIG. 8, FIG. 8a depicts an input data spectrum 802 with a standard SRME spectrum 804 for variable depth streamer data while FIG. 8b depicts the same variable depth input data spectrum 802 in comparison to an exemplary embodiment variable wavelet correction 806 in conjunction with a standard SRME technique. As is easily seen in FIG. 8a, the predicted spectrum 804 based on a standard SRME technique does not properly map to the input spectrum. Looking to exemplary embodiment FIG. 8b, it is clear that the exemplary embodiment variable wavelet correction added to a standard SRME technique enhances the accuracy of the technique. It should be noted that the variable wavelet correction provides similar results with other demultiples techniques.

The above-disclosed exemplary embodiments provide a system and a method for variable wavelet correction. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. Further, it is noted that the above embodiments may be implemented in software, hardware or a combination thereof. It is also noted that although the previously described exemplary embodiments refer to land-based seismic data acquisition, the methods and systems described herein are equally applicable to marine based seismic data acquisition.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method, performed by a processor executing instructions stored in a memory for correcting wavelet variations associated with a variable depth streamer configuration for seismic data collection, said method comprising:
   processing a recorded variable-depth datum pre-stack dataset, in a shot gather domain, by deghosting said pre-stack dataset wherein all multiples orders are processed;
   outputting a deghosted pre-stack dataset wherein said deghosted pre-stack dataset is normalized to a sea-surface datum and provided to a multiples elimination technique; and
   a pre-stack reghosting of a multiples model from said multiples elimination technique, in said shot gather domain, wherein said multiples model generated from said sea-surface datum is applied to said recorded datum to output a reghosted variable depth pre-stack dataset, and
   wherein said reghosted pre-stack dataset is input to an adaptive subtraction process of a demultiples model.

2. The method of claim 1, wherein a predefined gain is applied to low frequency and high frequency sides during said pre-stack reghosting.

3. The method of claim 1, wherein a predefined gain is applied to low frequency and high frequency sides during said pre-stack deghosting.

4. The method of claim 1, wherein a source-side zero-phasing designature is applied to said recorded datum pre-stack dataset prior to said deghosting.

5. The method of claim 4, wherein said deghosted pre-stack dataset is input to a multiples prediction of a Surface Related Multiples Elimination (SRME) technique.

6. The method of claim 4, wherein said deghosted pre-stack dataset is input to a multiples prediction of a Radon Demultiple technique.

7. The method of claim 1, wherein said recorded datum pre-stack dataset and said deghosted pre-stack dataset is two-dimensional data.

8. The method of claim 1, wherein said recorded datum pre-stack dataset and said deghosted pre-stack dataset is three-dimensional data.

9. A method, performed by a processor executing instructions stored in a memory for correcting wavelet variations associated with a variable depth streamer configuration for seismic data collection, said method comprising:
   processing a recorded variable-depth datum pre-stack dataset, in a shot gather domain, by deghosting said pre-stack dataset wherein all multiples orders are processed; and
   outputting a deghosted pre-stack dataset wherein said deghosted pre-stack dataset is normalized to a sea-surface datum and provided to a multiples elimination technique,
   wherein a source-side zero-phasing designature is applied to said recorded datum pre-stack dataset prior to said deghosting, and
   wherein said deghosted pre-stack dataset is input to a multiples prediction of a Shallow Water Demultiple technique.

10. The method of claim 9, wherein a predefined gain is applied to low frequency and high frequency sides during said pre-stack deghosting.

11. The method of claim 9, wherein said recorded datum pre-stack dataset and said deghosted pre-stack dataset is two-dimensional data.

12. The method of claim 9, wherein said recorded datum pre-stack dataset and said deghosted pre-stack dataset is three-dimensional data.

13. A method, performed by a processor executing instructions stored in a memory for correcting wavelet variations associated with a variable depth streamer configuration for seismic data collection, said method comprising:
   processing a recorded variable-depth datum pre-stack dataset, in a shot gather domain, by deghosting said pre-stack dataset wherein all multiples orders are processed; and
   outputting a deghosted pre-stack dataset wherein said deghosted pre-stack dataset is normalized to a sea-surface datum and provided to a multiples elimination technique,
   wherein a source-side zero-phasing designature is applied to said recorded datum pre-stack dataset prior to said deghosting, and
   wherein said deghosted pre-stack dataset is input to a multiples prediction of a Convolution Inter-bed multiples technique.

14. The method of claim 13, wherein a predefined gain is applied to low frequency and high frequency sides during said pre-stack deghosting.

15. The method of claim 13, wherein said recorded datum pre-stack dataset and said deghosted pre-stack dataset is two-dimensional data.

16. The method of claim 13, wherein said recorded datum pre-stack dataset and said deghosted pre-stack dataset is three-dimensional data.

17. A method, performed by a processor executing instructions stored in a memory for correcting wavelet variations associated with a variable depth streamer configuration for seismic data collection, said method comprising:
 processing a recorded variable-depth datum pre-stack dataset, in a shot gather domain, by deghosting said pre-stack dataset wherein all multiples orders are processed; and
 outputting a deghosted pre-stack dataset wherein said deghosted pre-stack dataset is normalized to a sea-surface datum and provided to a multiples elimination technique,
 wherein a source-side zero-phasing designature is applied to said recorded datum pre-stack dataset prior to said deghosting, and
 wherein said deghosted pre-stack dataset is input to a multiples prediction of a Tau-P Deconvolution technique.

18. The method of claim 17, wherein a predefined gain is applied to low frequency and high frequency sides during said pre-stack deghosting.

19. The method of claim 17, wherein said recorded datum pre-stack dataset and said deghosted pre-stack dataset is two-dimensional data.

20. The method of claim 17, wherein said recorded datum pre-stack dataset and said deghosted pre-stack dataset is three-dimensional data.

\* \* \* \* \*